July 24, 1934.  R. M. CRITCHFIELD  1,967,745
SIGNAL DEVICE
Filed April 2, 1930
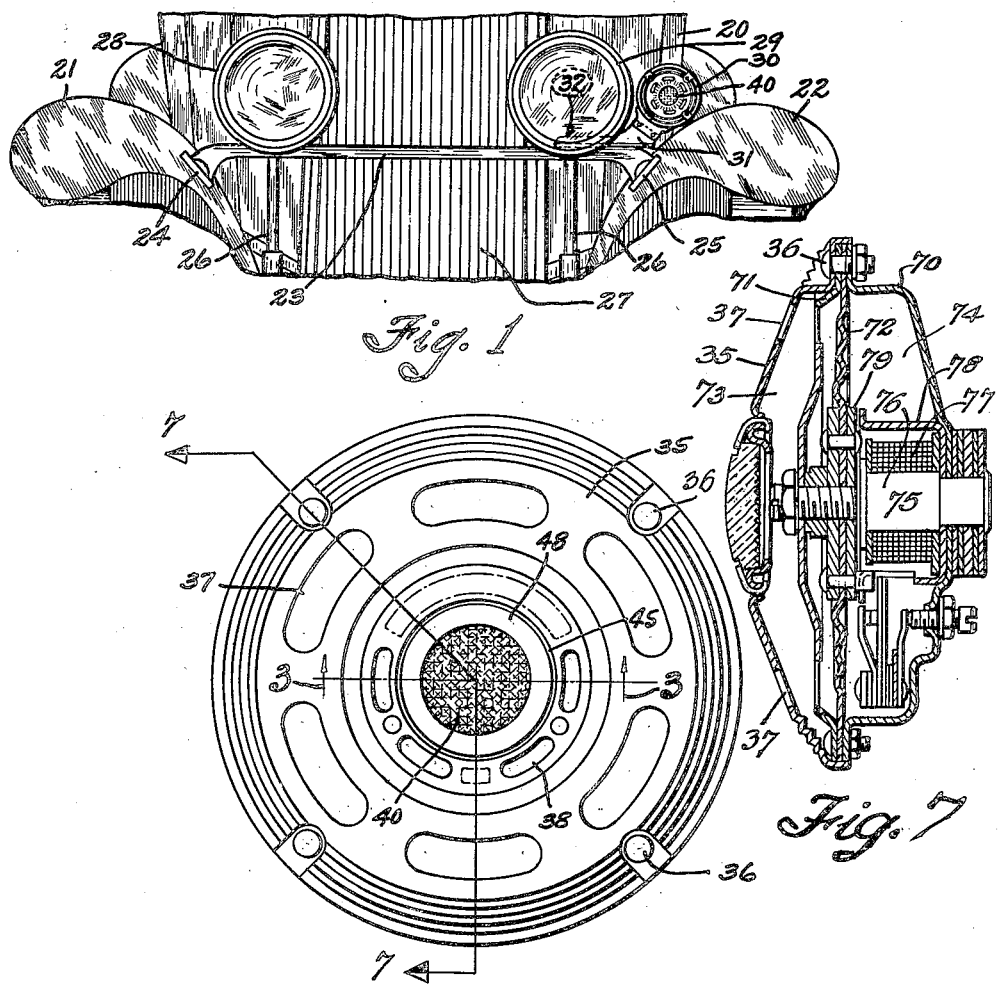
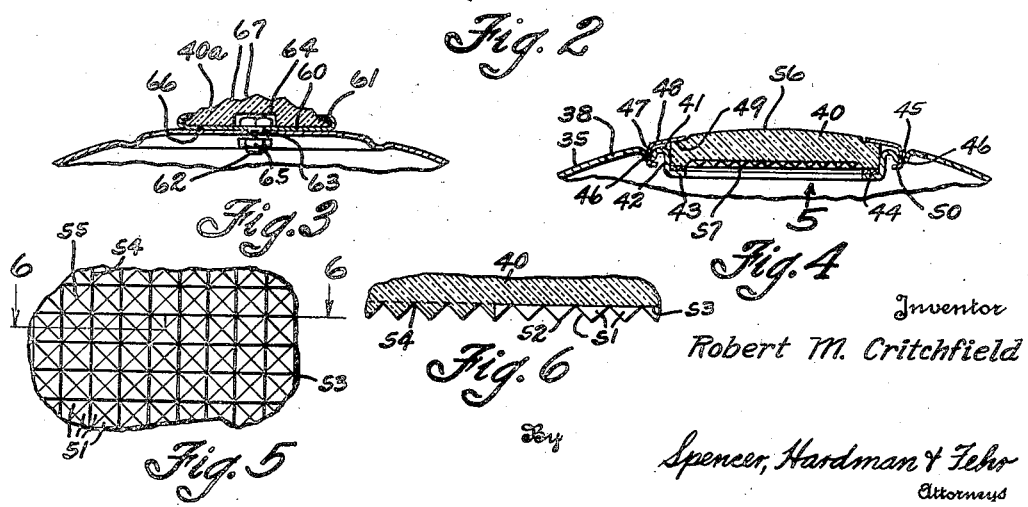
Inventor
Robert M. Critchfield
By Spencer, Hardman & Fehr
Attorneys

Patented July 24, 1934

1,967,745

UNITED STATES PATENT OFFICE 1,967,745

SIGNAL DEVICE

Robert M. Critchfield, Anderson, Ind., assignor, by mesne assignments, to General Motors Corporation, Detroit, Mich., a corporation of Delaware Application April 2, 1930, Serial No. 441,136

2 Claims. (Cl. 88—1)

This invention relates to signal devices and is particularly directed to a signal device of the vibratory type that may be mounted upon a vehicle or other structure of like character in a position to indicate the relative lateral extent thereof, and the proximate position thereof relative to an arbitrary marking.

One of the objects of the invention is to provide an adequate signalling means for automotive vehicles, whereby the same will be clearly indicated with respect to the roadway regardless of the condition of illumination.

A further object of the invention is to mark the relative position of the vehicle, when approached by an oncoming car.

A further object of the invention is to improve light receiving signals in general.

Further objects and advantages of the present invention will be apparent from the following description, reference being had to the accompanying drawing wherein a preferred embodiment of one form of the present invention is clearly shown.

In the drawing:

Fig. 1 is a fragmentary view in end elevation of an automotive vehicle provided with my signalling device.

Fig. 2 is an enlarged face view of my signalling device.

Fig. 3 is a fragmentary sectional view showing certain details of construction as indicated by the line and arrows 3—3 of Fig. 2.

Fig. 4 is a sectional view similar to Fig. 3, but showing the preferred form of construction.

Fig. 5 is a fragmentary view showing the reverse side, or the light reflecting surface of a signal device constructed in accordance with the invention, as indicated by the arrow 5 of Fig. 4.

Fig. 6 is a sectional view of the same, substantially as indicated by the line and arrows 6—6 of Fig. 5.

Fig. 7 is a sectional view taken on the line 7—7 of Fig. 2.

In vehicular traffic of the present day, there is great need for more adequate signalling devices and for signalling devices that will make the strongest appeal possible to the preservative intellect of the public in general. Under certain conditions a sounding signal is sufficient, but under other conditions, a warning signal of different character is preferable and in fact indispensable in order to manifest sufficient warning. Warning signals are adequate only when they make an impression on the intellect, and this impression so far as vehicular traffic is concerned must be made either through the sense of sight or hearing. Some individuals are more responsive to sight impressions than to sound impressions, while still others are perhaps more susceptible to a combination thereof.

These facts obtaining, the instant device has been developed, in which it can be assured that the utmost in signal warning will be accomplished, and individuals of either class provided with better facilities for detecting or for being appraised of a dangerous situation. The danger may reside in the near approach of an oncoming vehicle, or it may reside in a parked or standing vehicle on a poorly illuminated or dark highway. However, that vehicle fitted with the proposed signal device, will give the greatest possible warning signal, as will appear from the description to follow.

With particular reference to the drawing, 20 indicates the vehicle body having fenders 21 and 22 secured thereto, and tied together by the brace or tie rod 23 that has attachment with the fenders at 24 and 25. Columns 26 supported by the vehicle frame structure on either side of the radiator 27 have connection with the tie rod 23 and function to rigidly support head lamps 28 and 29. On the front of the vehicle, and at or near the left hand side of the front thereof, is mounted the improved signal device 30, by means of an absorption bracket 31 which may be secured to the column 26 supporting the lamp 29 in any preferred manner as indicated at 32. The preferred form of bracket 31 to be used, is claimed in a copending application filed March 17, 1930, Serial No. 436,445 and includes vibration absorbing means connecting the signal device 30 with the rigid portions of the vehicle structure, so that vibration set up in the signal device will not be transmitted to the supporting structure of the vehicle.

The signal device per se is illustrated in Fig. 2, and represents a vibratory sound signal having a face plate 35 which may be secured to the horn body by attaching bolts as indicated at 36. The face plate 35 is apertured at 37 and 38 for loading the vibratory member of the signal. At the center the plate carries a light reflecting medium 40 in the form of a rosette or glitter lens. In Fig. 4 is illustrated the preferred form of mounting the rosette 40, in which the face plate 35 is formed with a central recess or pocket 41, by providing a cylindrical depressed portion 42 terminating in a planar flange 43. Against this flange there is disposed a packing ring or compressible member 44 against which the glass rosette 40 is seated.

The face plate 35 is provided with an annular groove 45, substantially concentric with the pocket 41, and at radially disposed points is apertured or pierced at 46 to receive tongues 47 of a bezel ring 48. The ring 48 is of springy material and seats against a ledge 49 of the lens 40 as indicated in Fig. 4. When the ring 48 is disposed over the lens 40 as shown, and the tongues 47 pass through the apertures 46 and are bent against the face plate 35 as indicated at 50, the lens will be resiliently urged against the compressible member 44 and thereby prevented from moving about so as to cause objectionable noise or rattle.

In Fig. 3 is shown a second means of attaching the reflecting signal to the face plate 35, and is manifest in forming the rosette 40a as illustrated. Here, the rosette is backed by a cup 60, that has a flange 61 spun or otherwise formed to engage the edge of the rosette. Centrally of the cup there is an aperture for the reception of a bolt or screw 62, passing through an aperture 63 of the central portion of the face plate 35. The rosette 40a may be recessed or otherwise fashioned, at 64 for accommodation of the head of the screw device 62, and the screw is to be provided with a nut or washer or other fastening means as 65 which when tightened against the face plate 35 secures the parts in position.

As hereinbefore stated, the preferred form of reflecting lens is illustrated in Figs. 4, 5 and 6. The same is formed of a light transmitting medium as glass, one surface of which is provided with means for bending back and reflecting the light rays, while another surface conforms to the general outline of the member supporting it. In the present instance the lens is produced by forming the rear face of the rosette 40, with a great number of facets 51, that constitute the side walls of tiny pyramid-like prisms 52. This is accomplished by molding, casting, cutting or otherwise forming the rosette 40 with a reflecting surface, so as to provide grooves 53 intersecting at right angles grooves 54.

The grooves 53 and 54 are substantially right angular in cross section as will be seen by reference to Fig. 6. When the grooves are arranged at right angles to each other as stated, they will form intersecting rows of pyramids 52, each of which is bounded by four of the triangular areas representing the facets 51, and meeting at a common apex 55. By so forming the surface of the rosette 40, there is provided a reflecting surface of prismatic form, by which, light rays passing from the exterior surface 56 to the prismatic surface 57 will be bent back and broken up by the facets 51 into a myriad of light rays.

In the form illustrated in Fig. 3 is to be used, the inner surface of the lens 40a may be silvered or otherwise provided with a reflecting surface as indicated at 66, or dependence may be placed upon the adjoining facets 67, on the front face of the lens.

The signal device herein described, when mounted upon the vehicle as illustrated, that is on or near the left hand extreme of the front thereof, the reflecting jewel 40 will be near the lateral extreme of the vehicle and operate as a marker for the proximate central portion of the highway and will be indicative of the clearance region in relation to oncoming vehicles. When the signalling device is mounted on the left hand portion of the vehicle it is designed that the jewel 40 will be of green color, or characterized to produce a greenish reflection from light rays that may be impressed thereon. The sound signal thus mounted will be in line with the beam of light, or within the field of illumination from the oncoming vehicle, and will bend back sufficient light rays therefrom to give the proper warning indicia to the occupants of the oncoming vehicle.

The invention lends itself for greatest adaptability to the vibrator type of sound signal wherein the vibration producing means sets the face plate 35 into vibration, and thereby transmits it to the rosette 40. This causes the rosette to flicker and glimmer or gleam in the light rays of an oncoming vehicle or opposed illuminator.

The preferred means for actuating the signal is illustrated in Figs. 2 and 7, and represents a vibratory sound signal having a face plate 35 which is secured to a housing 70 by attaching bolts 36. The face plate 35 and the housing 70 cooperate with a clamping ring 71 and bolts 36 to rigidly secure at its peripheral edge a vibrating diaphragm 72, substantially as illustrated in Fig. 7. The diaphragm 72 divides the enclosure formed thereby into a sound chamber 73 and a motor chamber 74, within which a magnet motor 75 is supported by a core member 76 forming the axis and pole piece of a magnet winding 77 contained within a magnet cup 78. At the central portion of the diaphragm there is provided an armature 79 in attracted relation to the motor. Since the structure of the motor for operating the diaphragm 72 is well known to those skilled in the art, further detail description is not necessary.

As soon as the magnet motor is energized it attracts the armature 79, and upon deenergization of the motor the armature will return to its normal position. At the instant of this, the motor is again energized and the armature is again attracted by the magnet motor, whereupon the face plate 35 and the rosette 40 are caused to vibrate laterally due to the oscillations of the diaphragm 72. This signal device is particularly useful during the twilight hours between darkness and daylight under those conditions where there is sufficient light for objects to be detected at close range, but that are somewhat obscure or dimly outlined at more distant ranges. Under such conditions an approaching vehicle may not be seen as readily as under conditions of better illumination. Here the operator of the vehicle may operate his vibrating signal, that will cause the face plate and its jewel to vibrate. The vibrating signal will call the operator's attention to the situation and the glimmering of the jewel will mark the proximate location of the vehicle, and he will accordingly be appraised of the danger and safety regions of the road.

Whether or not the vehicle fitted with the signalling device is in motion or at a standstill as when parked, the jewel will operate to mark the vehicle's position, whatever the source or degree of the opposing illuminator, for the great number of reflecting facets on the lens will bend back such light rays as they may receive and transpose them into the desired signal indicia.

While the form of embodiment of the present invention as herein disclosed, constitutes a preferred form, it is to be understood that other forms might be adopted, all coming within the scope of the claims which follow.

What is claimed is as follows:

1. A signal device comprising in combination; a housing; a vibrating unit supported by said housing; a face plate attached to said housing; a light reflecting jewel mounted on said plate; and electrical means for actuating said vibratory unit, whereby said face plate and jewel are vibrated and cause the jewel to flicker in the light rays of a vehicle.

2. A sound signal comprising in combination; a magnet motor; a supporting member for said motor; a diaphragm attached to said member and adapted to be vibrated by said motor; a face plate carrying a light reflecting means attached to said supporting member, said face plate being responsive to the vibrations of said diaphragm thereby coincidently vibrating the light reflecting means.

ROBERT M. CRITCHFIELD.